Jan. 31, 1961 R. A. MAGRATH 2,970,216
SAMPLE CELL FOR SPECTROSCOPIC APPARATUS
Filed Aug. 7, 1958 2 Sheets-Sheet 1

INVENTOR.
Richard A. Magrath
BY
Morse & Altman
ATTORNEYS

United States Patent Office

2,970,216
Patented Jan. 31, 1961

2,970,216

SAMPLE CELL FOR SPECTROSCOPIC APPARATUS

Richard A. Magrath, Boston, Mass., assignor to Baird-Atomic, Inc., Cambridge, Mass., a corporation of Massachusetts Filed Aug. 7, 1958, Ser. No. 753,758

10 Claims. (Cl. 250—43.5)

The present invention relates to spectroscopy and, more particularly, to cells for carrying minute liquid chemical samples that are to undergo spectroscopic examination. By way of example, such a cell is useful in an infrared spectrophotometer, in which infrared radiation of sequentially different wave lengths is transmitted through an unknown fluid chemical sample in the cell for the purpose of obtaining an absorption pattern to be identified by comparison with standard patterns. In the past, a hypodermic needle has been used as a capillary probe to position the sample in and to remove the sample from the cell. This has given rise to difficulties in precisely predetermining the position of the sample in the cell as required by the remainder of the system and in removing the sample from the cell for further use without loss or contamination.

The primary object of the present invention is to provide, for use in a spectroscopic system, a novel cell comprising a component, transparent to radiation, having a capillary bore accessible to radiation, one end of which is connected to a capillary probe and the other end of which communicates with a syringe. The sample may be drawn through the probe into a predetermined radiation absorbing position in the bore by the syringe and may be ejected from the bore through the probe by the syringe, under extremely precise control and with substantially no loss or contamination. This capillary condition exists throughout the probe and the bore so that a sample drawn into the bore through the probe is precisely positioned laterally by the bore itself and is precisely positioned longitudinally by the suction or compression applied to the bore.

Other objects of the present invention will in part be obvious and in part appear hereinafter.

The invention accordingly comprises the device possessing the features, properties and relation of components, which are exemplified in the following detailed disclosure and the scope of which will be indicated in the claims.

For a fuller understanding of the nature and objects of the present invention, reference should be had to the following detailed description taken in connection with the accompanying drawings wherein.

Figure 5:
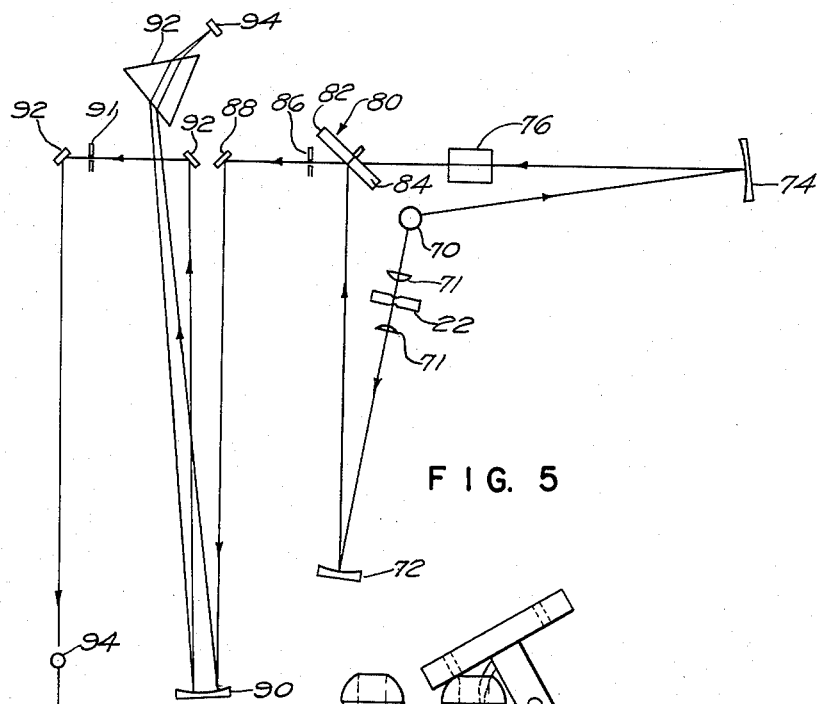
Fig. 5 is a schematic view of the location, in an infrared spectrophotometer, of the sample cell of Fig. 1.
Figure 4:
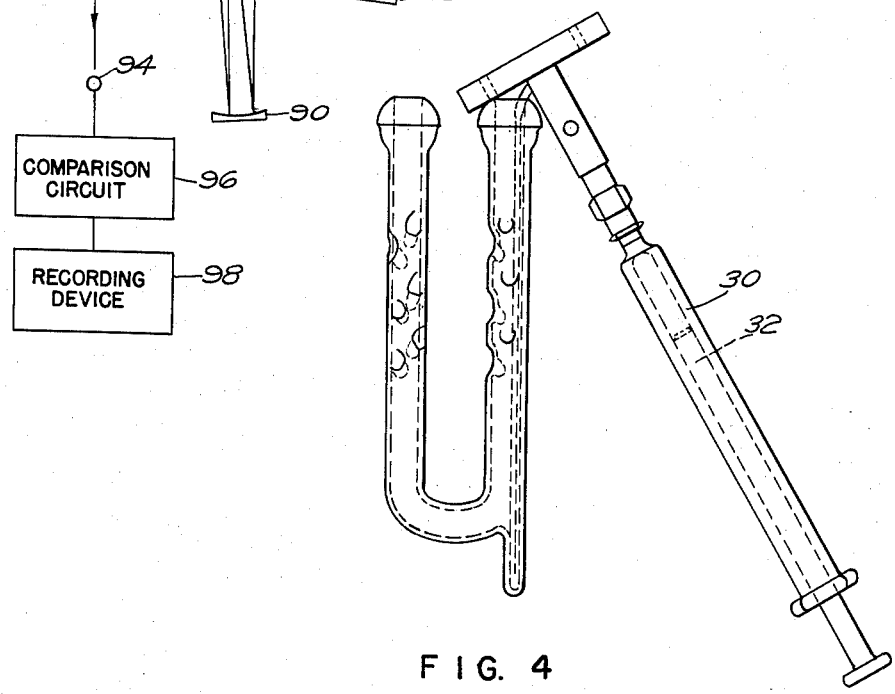
Fig. 4 is a plan view of the sample cell of Fig. 1 in use.

Generally, the illustrated sample cell comprises a base 20 for supporting and positioning the operating components of the infrared spectrophotometer generally shown in Fig. 5. The sample comprises a body 22 having a capillary bore 25 within which a fluid chemical sample may be positioned. This sample may be examined spectroscopically through windows 24, 24. Communicating with one end of bore 26 is a capillary probe 26 through which the sample may be drawn into bore 25. Communicating with the other end of bore 25 is a fitting 28 that is designed to receive the shank of a syringe, shown in Fig. 4 as including a cylinder 30 and a piston 32, by which the sample is drawn through probe 26 into bore 25 or from bore 24 through probe 26. Although, in general, a similar sample cell may be designed for use in conjunction with any type of photometric system, the illustrated sample cell is particularly useful in infrared spectrophotometry.

Figure 1:
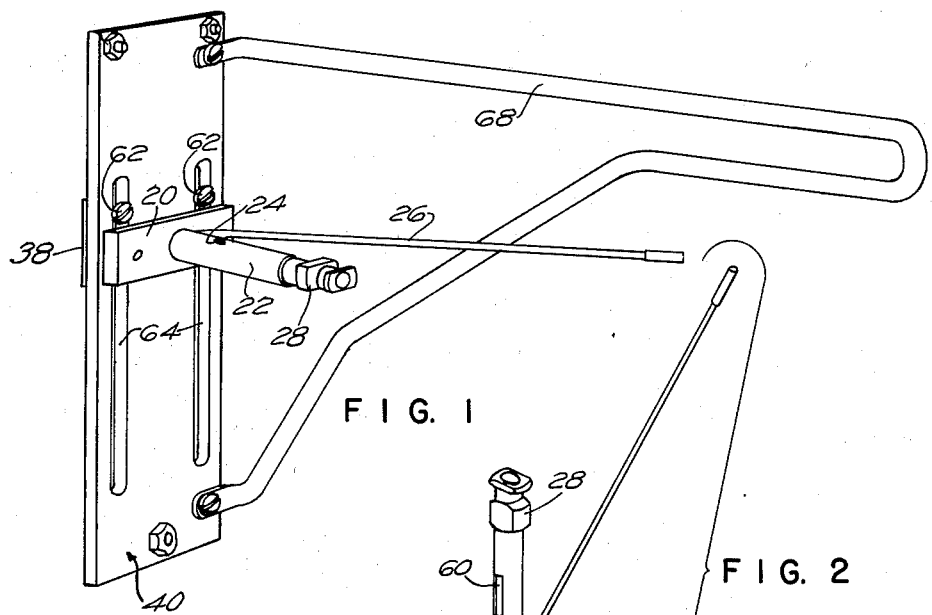
Fig. 1 is a perspective view of a preferred embodiment of a sample cell of the present invention, predeterminedly positioned upon a mount to be predeterminedly positioned in an infrared spectrophotometer.
Figure 2:
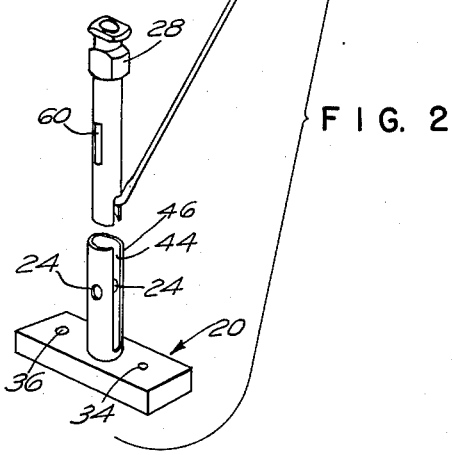
Fig. 2 is an exploded view of components of the sample cell of Fig. 1.
Figure 3:
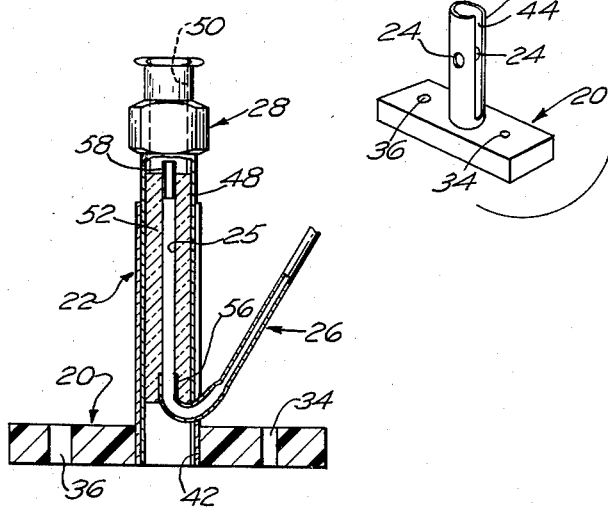
Fig. 3 is an enlarged cross-sectional view of the sample cell of Fig. 1.

As is best shown in Fig. 3, base 20 is in the form of a dimensionally stable plastic, for example methyl methacrylate, plate having a small diameter bore 34 and a large diameter bore 36 extending therethrough in a direction perpendicular to the faces of the plate. Bores 34 and 36 serve to receive pins of corresponding diameter that extend from an adjusting plate 38 on holder 40 in a manner to become apparent below. Base 20 is provided with an enlarged medial bore 42 that receives the lower end of a metal barrel 44, which constitutes the casing of body 22. Windows 24, 24 are provided by barrel 44 at positions on its circumference that are diametrically opposed. Barrel 44 provides an elongated slot 46 that is parallel to the axis of bore 25, extending through the upper end of the barrel 44 and into adjacence with the lower end of barrel 44. Slidably fitting into barrel 44 is a metallic shell 48 that is secured at its upper end to fitting 28. Fitting 28 is provided with a bore 50 through which suction or compresison may be applied by the syringe shown in Fig. 4. Press fitted into shell 48 through its lower end is a silver chloride insert 52 that provides capillary bore 25. Extending into the lower end of bore 25 is the reversely bent end 56 of capillary probe 26. Extending into the upper end of bore 54 is a stub tube 58. Insert 52, in the vicinity of windows 24, 24, is flattened as at 60, 60 in order to prevent refraction of electromagnetic radiation transmitted therethrough. It will be understood that for the purposes of transmitting infrared radiation, insert 52 may be composed of a metal halide other than silver chloride such as sodium chloride, potassium chloride, etc.

As indicated above, base 20 is provided with bores 34 and 36 of different diameters that receive a pair of pins of corresponding diameters carried by adjusting plate 38. Slide 38 is fastened in predetermined longitudinal position with respect to holder 40 by a pair of screws 62, 62 that project through a pair of longitudinal slots 64, 64 in order to grip holder 40 between the heads of the screws and the slide. Holder 40 is provided with a handle 68 for predeterminedly positioning in the infrared spectrophotometer now to be described.

Fig. 5 is a diagrammatical view of the rudiments of an illustrative infrared absorption spectrophotometer constructed and operated as follows. Radiation from an infrared source 70 is transmitted through sample cell 22 via condensing lenses 71, 71 to spherical mirror 72 and is reflected by spherical mirror 74 through a reference cell 76. The transmission of the reference cell may be defined as 100 percent. Thus, in determining the ratio of the transmission of the sample to that of the reference, the instrument measures percentage transmission by the sample of a given wave length. The infrared beams thence converge at right angles to each other toward a point of intersection at which a mechanical alternator 80 is located. Alternator 80 is in the form of a motor driven, rotating disc (disposed in a plane perpendicular to the drawing), one-half sector 82 of which is a plain mirror and the other half sector 84 of which is a transparent window. When the reflecting sector is at the beam intersection, the beam from sample cell 22 is directed through a slit 86 and the beam from reference cell 76 is occulted. When the transparent sector is at the beam intersection, the beam from reference cell 76 is directed through slit 86 and the beam from sample cell 22 is occulted. The alternate beams through slit 86 are directed by a plane mirror 88 to a concave mirror 90 by which they are reflected to a rotatable prism 92 for selection of a desired wave length range. A mirror 94 reflects the beams back through prism 92 to mirror 90 which directs them to an exit slit 91, a plane mirror 92 and a bolometer 94. The resulting electrical intensities are compared in a suitable circuit 96 and an electrical signal representing the unbalance is applied to a servo mechanism 98 which records a representation of percentage transmittance vs. wave length.

In operation, a sample contained at the apex of a pipette 100 is drawn into bore 25 of insert 52 as follows. Capillary probe 26 is inserted into the apex of the pipette and piston 32 of the syringe, which is coupled to fitting 28, is slowly withdrawn from cylinder 30 until the sample is aligned in bore 25 with windows 24, 24. Next, capillary probe 26 is removed from the pipette and base 20 is properly positioned on holder 40. Then, holder 40 is positioned within the infrared spectrophotometer of Fig. 5. The sample now is precisely predetermined in three dimensions with respect to the elements of the infrared spectrophotometer.

Since certain changes may be made in the above device without departing from the scope of the invention herein involved, it is intended that all matter contained in the above description or shown in the accompanying drawings shall be interpreted in an illustrative and not in a limiting sense.

What is claimed is:

1. A sample cell for spectroscopic examination, said sample cell comprising a base for prepositioning and orienting said cell with respect to a spectroscopic system, a body component having an elongated capillary bore, said body component being secured to said base for transmitting radiation from said system through a sample within said bore, a capillary proble communicating with one end of said bore, and a fitting for a syringe communicating with the other end of said bore.

2. The sample cell of claim 1 wherein said body includes an insert that is transparent to said radiation, said bore being in said insert.

3. The sample cell of claim 2 wherein said radiation is infrared and said insert is composed of a metal halide.

4. The sample cell of claim 1 wherein said body includes an insert that is transparent to said radiation, said bore being in said insert, and a shell for said insert, said shell having opposed windows aligned with said bore.

5. The sample cell of claim 4 wherein the periphery of said insert is flattened at positions adjacent to said windows.

6. A sample cell for spectroscopic examination, said sample cell comprising a base for prepositioning and orienting said cell with respect to a photometric system, a body component having an elongated capillary bore, said body component being secured to said base for transmitting radiation from said system through a sample within said bore, a capillary probe communicating with one end of said bore, and a syringe including a cylinder communicating with the other end of said bore and a piston slidable in said cylinder.

7. The sample cell of claim 6 wherein said body includes an insert that is transparent to said radiation, said bore being in said insert, and a shell for said insert, said shell having opposed windows aligned with said bore.

8. The sample cell of claim 7 wherein the periphery of said insert is flattened at positions adjacent to said windows.

9. A sample cell for spectroscopic examination, said sample cell comprising a base for prepositioning and orienting said cell with respect to a photometric system, a body component having an elongated, small diameter capillary bore of circular cross-section, said body component being secured to said base for transmitting radiation from said system through a sample within said bore, an elongated capillary probe communicating with one end of said bore, and a syringe including a cylinder communicating with the other end of said bore and a piston slidable in said cylinder, said body component including an insert that is transparent to said radiation, said bore being formed in said insert, and a shell for said insert, said shell having opposed windows aligned with said bore, the periphery of said insert being flattened at positions adjacent to said windows.

10. A sample cell for spectroscopic examination, said sample cell comprising a base for prepositioning and orienting said cell with respect to a photometric system, a body component having an elongated, small diameter capillary first bore of circular cross-section, said body component being secured to said base for transmitting radiation from said system through a sample within said bore, a probe providing a capillary second bore communicating with one end of said first bore, and a syringe including a cylinder communicating with the other end of said first bore and a piston slidable in said cylinder, said body component including an insert that is transparent to said radiation, said bore being formed in said insert and a shell for said insert, said shell having opposed windows aligned with said first bore, the periphery of said insert being flattened at positions adjacent to said windows, the axis of said first bore and said second bore intersecting at an oblique angle.

References Cited in the file of this patent

UNITED STATES PATENTS 2,637,817    Herbert _____ May 5, 1953

OTHER REFERENCES

Williams et al.: "Self-Filling Micro Infra-Red Absorption Cell," The Review of Scientific Instruments, vol. 18, No. 12, pages 927 and 928; December 1947.

McMahon et al.: "A Low Temperature Infra-Red Transmission Cell," Journal of The Optical Society of America, vol. 39, No. 9, pages 786 to 790, September 1949.